Dec. 12, 1967 C. E. BOHNSTEDT 3,358,182

AUTOMATIC DEGAUSSING CIRCUIT WITH STAND-BY TUBE-FILAMENT-HEATER CIRCUIT FOR COLOR TELEVISION RECEIVERS

Filed Feb. 24, 1966

WITNESSES

Bernard R. Giegue[?]

Leon M. Garman

INVENTOR
Charles E. Bohnstedt

BY [signature]
ATTORNEY

United States Patent Office 3,358,182

Patented Dec. 12, 1967

3,358,182

AUTOMATIC DEGAUSSING CIRCUIT WITH STAND-BY TUBE-FILAMENT-HEATER CIRCUIT FOR COLOR TELEVISION RECEIVERS

Charles E. Bohnstedt, Franklin Township, Somerset, N.J., assignor to Westinghouse Electric Corporation, Pittsburgh, Pa., a corporation of Pennsylvania Filed Feb. 24, 1966, Ser. No. 529,760
10 Claims. (Cl. 315—8)

Figure 1:
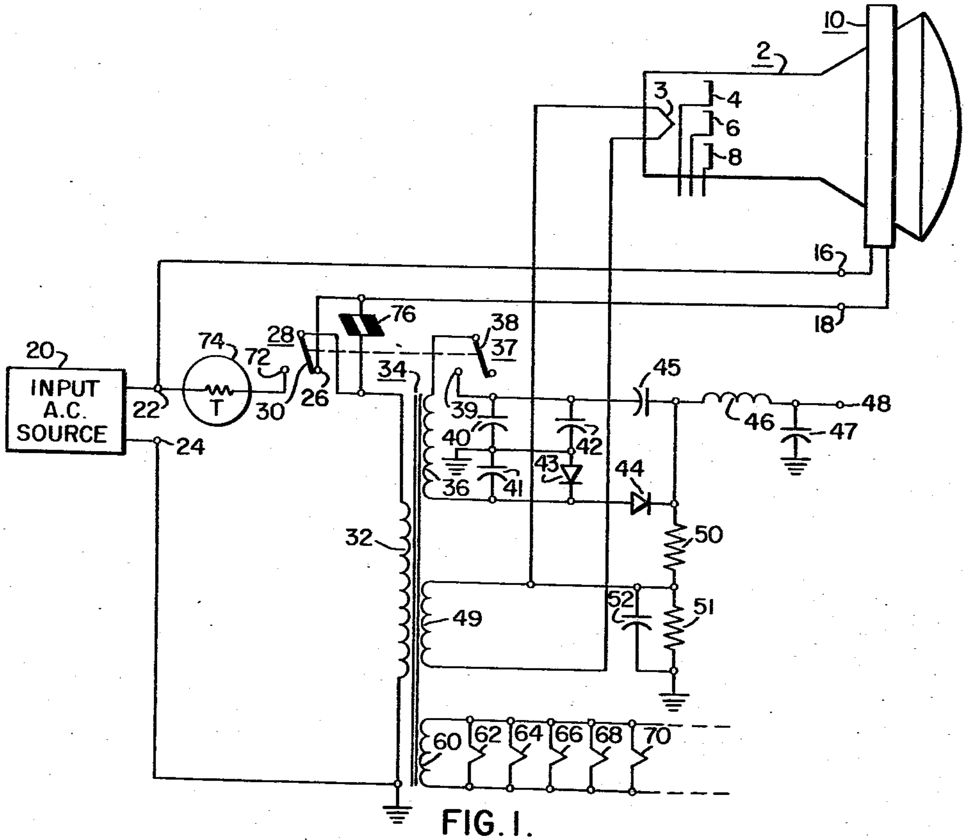

The present invention relates to circuitry for use in television receivers and more particularly to circuitry for use in color television receivers providing the function of degaussing the color picture tube thereof and providing the substantially instantaneous presentation of picture and sound.

It is necessary for the proper operation of a color television receiver that the magnetic structures thereof including the chassis and especially the color picture tube be degaussed, that is, the magnetic structures of the receiver be demagnetized to a low remnant flux density. The magnetic portions of the receiver especially the shadow mask of the color picture tube upon becoming magnetized will affect the deflection of the electron beams from the three electron guns of the color picture tube and thereby will not permit true color reproduction. The magnetic structures of the color tube may become magnetized to various levels due to the earth's magnetic field or other spurious field generated, for example by household appliances, such as a vacuum cleaner, used in the vicinity of the color receiver. The chassis and picture tube of the color receiver are usually degaussed sometime during the manufacturing operation of the receiver. However, when placed in the user's home it is necessary that the color receiver be degaussed again due to the changed circumstances and the relative ease with which the magnetic structures become magnetized.

In the past, color receivers have been demagnetized by a serviceman using a degaussing coil which the serviceman carries as part of his installation equipment. An AC current is passed through the degaussing coil with the serviceman holding the coil adjacent the receiver and then gradually withdrawing the coil from the receiver. This causes a gradually decreasing alternating field to be induced in the magnetic structures of the receiver as the coil is drawn away from the receiver, with the alternating field gradually decreasing to a low remnant flux density which is the desired magnetic state. After the receiver has been degaussed, however, it may become magnetized again to various levels due to spurious magnetic fields induced in the vicinity of the receiver, or due to the moving of the set to a different position in the room. If this occurs, it becomes necessary for the serviceman to return and again degauss the receiver. As a feature in newer color television receivers, an automatic degaussing circuit is offered. Patent No. 2,962,621 by Fernald and Patent No. 2,962,622, by Popovich, both teach automatic degaussing circuits which will perform the degaussing function of the receiver each time the set is turned on. In automatic degaussing circuits, a degaussing coil is fitted around the color picture tube and then a decreasing alternating current is applied to the coil which demagnetizes the magnetic structures of the tube and especially the shadow mask thereof. With the automatic degaussing feature, a user of the color receiver, each time the set is turned on, performs the degaussing function which averts any color distortion that might arise due to the undesired magnetization of magnetic structures of the chassis and picture tube during the interim of non-operation of the receiver.

From the viewer's standpoint another highly desirable feature that can be offered in a television receiver is that of providing substantially instantaneous picture and sound after the set has been turned on. The normal receiver without such a feature may take as long as 30 or 40 seconds before both picture and sound are presented. However, with such a feature the picture and sound will be presented within approximately 6 seconds from the turning on of the receiver. This latter type of operation may be accomplished by applying reduced heater current to the heater elements of the various tubes of the receiver including the cathode ray tube of the receiver when the receiver is turned off for stand-by operation. By the application of the reduced current to the heater elements, the various tubes will be kept in a heated, stand-by condition, so that, when the receiver is turned on, no time delay will be required for the tubes to heat up which is the usual cause for the delay in presenting video and sound information. In the normal receiver no heater current is supplied when the receiver is turned off; therefore, it becomes necessary to reheat the cathode structures of the tube each time the set is turned on. The mechanical shock of heating and cooling the heater or filament elements each time the set is turned on or off may also impair the lifetime of the tube. This is an especially serious problem when considering the expensive three electron gun tube used in color television receivers. Therefore, any means to extend the lifetime of the color picture tube would be a highly desirable additional feature to be used in the receiver.

In the prior art it has been necessary to provide separate components for achieving the automatic degaussing and instantaneous operation features in a television receiver. This, of course, increases the cost of the receiver as well as requiring additional components which may become defective. It therefore would be highly desirable if the degaussing and instantaneous operation features could be incorporated into a color television receiver using common components.

It is therefore an object of the present invention to provide new and improved television circuitry providing the combined features of automatic degaussing and substantially instantaneous operation.

It is a futrher object of the present invention to provide new and improved color television circuitry wherein automatic degaussing and substantially instanteous operation are provided by using common components.

Broadly, the present invention provides a degaussing and instantaneous operation circuit for use in a television receiver including a color picture tube in which a degaussing coil is employed to degauss the picture tube when the receiver is placed in its operative condition. The same coil is also utilized to apply reduced heater current to the various tubes of the receiver when the receiver is placed in its inoperative, standby, condition.

Figure 2:
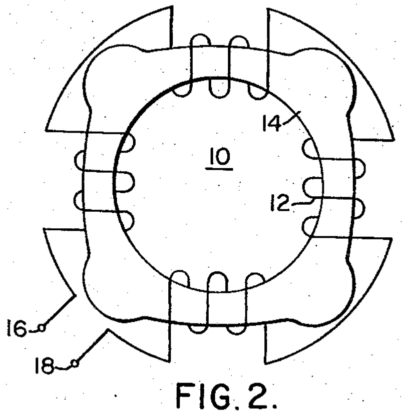

These and other objects and advantages of the present invention will become more apparent when considered in view of the following specification and drawing, in which:

FIGURE 1 is a schematic diagram of the television circuitry of the present invention; and FIG. 2 is a schematic diagram of the degaussing coil assembly.

Referring to FIG. 1, a color picture tube 2 is shown schematically and may comprise any well known cathode ray color tube design of the shadow mask type. The color tube 2 includes a heater element 3 and three cathode electrodes 4, 6 and 8. The heater element 3 is disposed adjacent the cathode elements and supplies heat energy to the cathode elements as is well known in the art.

Referring also to FIG. 2, a degaussing coil assembly 10 is disposed about the color picture tube 2. The degaussing coil assembly includes a degaussing coil 12 and a magnetic member 14, which compries a magnetic material. The degaussing coil assembly 10 is situated on the tube 2 so as to be operative upon the magnetic structures of the color tube especially the shadow mask thereof. The degaussing coil 12 is shown to include four separate windings which are connected in series and which have as input terminals thereto a pair of terminals 16 and 18. By the application of an alternating current to these terminals, which decreases in amplitude with time, a magnetic field will be induced in the member 14 and the shadow mask of the tube, which will gradually decrease in amplitude with time to establish a low remnant magnetic flux density state in the magnetic structures and thereby degauss the picture tube 2.

In addition to the degaussing function to be performed by the degaussing coil 12, the coil 12 is also intended to operate as an inductive reactance in the power supply circuitry of the television receiver to reduce the heater current supplied to the heater elements of the various tubes of the television receiver when the receiver is placed in its inoperative standby condition.

The operating current for the television receiver is supplied by an input AC source 20, which may be the typical 120 volt, 60 cycle per second, line voltage. The input AC source has a pair of terminals 22 and 24, with the latter being grounded. The terminal 22 is connected to the terminal 16 of the degaussing coil. The other terminal 18 of the degaussing coil is connected to a terminal 26 of a switch assembly 28. The switch assembly 28 operates as the on-off switch for the television receiver and also establishes the necessary circuit conditions for stand-by operation of the receiver. The switch assembly 28 is shown in FIG. 1 in its switched off state for stand-by operation.

The stand-by operation will now be explained. The switch assembly 28 includes a movable arm 30 which has one end during the stand-by operation connected to the terminal 26. The other end is connected to one end of the primary winding 32 of a power transformer 34. The other end of the primary winding 32 is grounded. Power transformer 34 includes a secondary winding 36 which has connected thereacross power supply circuitry commonly found in television receivers. Connected in series with the secondary winding 36 is a switch assembly 37 which includes a movable arm 38 and a terminal 39. The movable arm 38 is mechanically coupled to the movable arm 30 of the switch assembly 28. In the position shown in FIG. 1, with movable arm 38 away from the contact 39, the power supply circuitry is disconnected from being energized by the input AC source with the television receiver being in its stand-by condition.

The power supply circuitry includes a pair of capacitors 40 and 41 connected in series between the terminal 39 and the bottom end of the winding 36. The junction between the capacitors 40 and 41 is grounded. A capacitor 42 is connected between the terminal 39 and ground, with a diode 43 being connected with its anode at ground and cathode at the bottom end of the winding 36. A diode 44 is connected with its anode to the cathode of the diode 43 and its anode to one end of a capacitor 45 which has its other end connected to the terminal 39. A filter inductor 46 has one end connected to the capacitor 45 and its other end connected to a filter capacitor 47 which has its other end grounded. At the junction between the filter elements 46 and 47 is connected a terminal 48 from which a unidirectional filtered potential may be taken to be utilized as direct operating potential (B+) within the television circuitry as is well known in this art.

A CRT heater winding 49 is also provided in the power transformer 34. Connected across the winding 49 is the heater element 3 of the color picture tube. Also applied to the heater element 3 is a unidirectional potential from a voltage divider including resistors 50 and 51 which are connected in series between the junction between capacitor 45 and the inductor 46 and ground. A bypass capacitor 52 is connected across the resistor 51. The junction between the resistors 50 and 51 is connected to one end of the heater element 3. The purpose of direct current connection to the heater element 4 is to reduce heater burnouts in the cathode ray tube resulting from arc-overs within the cathode ray tube itself. The direct current is necessary to keep the cathode ray tube within its heater cathode breakdown rating. Such a direct current connection is well known in this art.

A tube heater winding 60 is also provided in the power transformer 34 with a plurality of heater elements 62, 64, 66, 68 and 70 being connected thereacross. These heater elements are associated with the various vacuum tubes of the television receiver.

The various heater elements are energized by the output of the heater windings 49 and 60. However, a reduced heater current will be supplied to each of these elements than is desired for normal operation of the various tubes. This may be seen from the following. The primary winding 32 of the power transformer 34 is energized during the standby operation of the receiver with the switch assembly 28 in the position shown. However, a reduced voltage is provided to the primary winding 32 due to the fact that the degaussing coil 12 is connected in series between the input AC source 20 and the winding 32, a circuit being completed to the primary winding 32 including: the terminals 22 and 16, the degaussing coil 12, the terminals 18 and 26, the arm 30, and the primary winding 32 to ground. The voltage, however, applied directly across the primary winding 32 is reduced by the magnitude of the impedance drop across the degaussing coil 12, which is so designed to introduce a sufficient drop so that the voltage across the primary winding 32 will supply only enough output from the heater winding 60 to heat the various heater elements without causing a large emission of electrons from the various cathode electrodes thereof. The degaussing coil 12, for example, may be designed to have the same impedance as the primary winding 32 so that half voltage will be applied to the winding 32 which will cause half voltage to appear at the secondary heater winding 60. This will permit the cathodes of the various tubes to be maintained at a relatively high temperature so that when the receiver is turned on and full voltage is applied to the primary winding 32 and the secondary winding 36 is operative, the tubes will substantially instantly respond to provide an output therefrom with picture and sound being immediately provided at the television receiver. Thus, for stand-by operation the switch assembly 28 is placed in position shown, and the degaussing coil 12 operates as a series reactor to reduce the output of the power transformer 34, which, in turn, reduce the output supplied to the various heater elements and hold the heater elements in a stand-by heated state for the eventual full energization when the receiver is turned on.

In order to turn the receiver on, the switch assembly 28 is placed in its on position with the movable arm 30 moved away from the terminal 26 to engage a terminal 72 and the movable arm 38 of the switch 37 moved to engage the terminal 39. Between the terminal 72 and the terminal 22 of the source 20 is connected a resistor 74 which has a negative temperature coefficient. Such a resistor is commonly called a thermistor. The characteristics of a thermistor having a negative temperature coefficient are such that at a low temperature the device will present a relatively high resistance; however, as the temperature of the thermistor increases, the resistance thereof will decrease to a relatively low value. For example, a typical thermistor which might be used in the present circuit would have a cold resistance of approximately 120 ohms and a hot resistance of approximately 2 ohms.

A voltage responsive device 76 is connected between the terminals 26 and 18 and the top end of the primary winding 32. With the switch assembly 28 in its off position, the movable arm 30 contacts the terminal 26 shorting out the voltage responsive device 76 and effectively takes it out of the circuit. However, when the contact arm 30 is moved to the on position, contacting the terminal 72, the voltage responsive device 76 is placed in series with the degaussing coil 12. The voltage responsive device 76 may for example comprise a varistor which has a relatively low impedance with a high voltage applied thereacross and a relatively high impedance with a low voltage applied thereacross.

The degaussing function begins by the turning on of the television receiver. Upon the closing of the switch assemblies 28 and 37, a transient alternating current begins to flow through the degaussing coil 12. The current envelope starts at a relatively large value and decays to a small value thus causing the demagnetization of the magnetic material adjacent to the degaussing coil 12. The transient waveform caused by the closing of the switches 28 and 37 is a damped alternating one at the frequency of the input AC source which normally would be 60 cycle. The damped nature of the alternating waveform during the initial transient period is due to charging of the capacitive elements and the clamping action of the diodes 43 and 44 in the power supply circuit. The envelope of the decay of the alternating waveform is determined principally by the supply capacitors, the filtering inductor, and leakage inductance of the power supply circuit, along with any resistive elements being included therein. The degaussing takes place in a relatively short time interval of approximately 2 seconds within which the initial transient has decayed to a negligible value, with the power supply circuitry reaching steady state conditions shortly thereafter. Since the heater elements have been preheated, the various tubes of the television receiver will be operative within a short period to operate normally with power supply current being drawn from the power supply.

Initially, thermistor 74 is in its high impedance state since it is at its cold resistance at this time. However, with the arm 30 contacting the terminal 72, the thermistor 74 is connected in series between the AC source and the primary winding 32. Current will thus begin to pass through the thermistor 74 and will heat the thermistor and thereby lower its impedance. The thermistor 74 is connected in parallel across the degaussing coil 12 and the varistor 76 which is in its low impedance state at this time because of the relatively high voltage being applied thereacross initially. Due to the relatively high cold resistance of the thermistor 74, a relatively large amplitude alternating current will continue to flow from the terminal 22, to the terminal 18, through the degaussing coil 12, to the terminal 18, through the varistor 76 to the primary winding 32. As the thermistor 74 is heated more and more current flows therethrough away from the degaussing coil 12. As the impedance of the thermistor 74 reaches its hot value substantially all of the AC voltage across the terminals 22 and 24 is applied to the primary winding 32, with only a small voltage being developed across the thermistor 74. At this time the alternating current through the degaussing coil 12 will have reached a very low value. With a low voltage being developed across the thermistor 74, the varistor 76 will have a relatively low voltage applied thereacross and thus provides a high impedance which will reduce the current through the degaussing coil 12 to a very small value.

With the thermistor 74 in its low impedance state the degaussing coil 12 is essentially shunted out of the circuit with the thermistor 74 effectively acting as a switch. Moreover, the use of the varistor 76 completes the switching action when the voltage across the thermistor 74 drops to a low value to drop the voltage across the varistor 76 so that it will then assume its high impedance state. With the thermistor 74 shunting the degaussing coil 12 and the varistor 76 in series with the coil, the current through the coil is reduced to a nominal value. The thermistor 74 and varistor 76 thus act as a switching circuit to take the degaussing coils out of the circuit and prevent the degaussing coil 12 from having any adverse effects upon the operation of the color picture tube once the degaussing function has been completed.

Full voltage being applied to the primary winding 32, full voltage is developed across the heater windings 49 and and 60, which will energize the heater element 3 of the color picture tube and the heater elements 62, 64, 66, 68 and 70 of the various other tubes of the television receiver.

It can thus be seen that the degaussing coil performs in addition to its usual degaussing function when the set is turned on the function of a voltage reducing inductive reactance in series between the input AC source 20 and the primary winding 32 of the power transformer 34 when the receiver is placed in its off, stand-by condition. Once the receiver is turned on, the degaussing function is initiated and is completed within a relatively few cycles of alternating waveform applied to the degaussing coil 12. The degaussing operation is finished before the picture and sound are presented from the receiver which is accomplished in approximately six seconds; thus the degaussing operation does not affect the picture since it is completed before the picture is presented.

It should also be noted that other types of degaussing circuits and power supply circuits could be utilized in place of the specific example given. For example, a resonant type of automatic degaussing circuit could be utilized such as taught in the Fernald Patent No. 2,962,621.

Although the present invention has been described with a certain degree of particularity, it should be understood that the present disclosure has been made only by way of example and that numerous changes in the details of the circuitry and the combination and arrangement of parts and elements can be resorted to without departing from the scope and the spirit of the present invention.

I claim as my invention:

1. In a television receiver having means for placing it in an operative or in an inoperative condition with a previously connected source of alternating potential and including a color picture tube having a heater element, the combination of: a field generating and standby circuit comprising, a coil disposed in operative relationship to said picture tube; switching means for connecting said coil in series with said source to reduce the heating current to said heater element for standby operation when said receiver is in its inoperative condition and for permitting full heating current to be applied to said heater element when said receiver is in its operative condition; and means operative with said coil for generating a field operative on said picture tube when said receiver is placed in said operative condition.

2. The combination of claim 1 wherein: said coil comprises a degaussing coil, said means operative with said degaussing coil is operative to decrease the alternating current through said degaussing coil when said receiver is placed in its operative condition to demagnetize said picture tube.

3. The combination of claim 2 further including: a transformer including primary, secondary and heater windings; said switching means operative to connect said degaussing coil in series between said source and said primary winding when said receiver is in its inoperative condition so that reduced heating current is supplied to said heater element and to disconnect said degaussing coil when said receiver is in its operative condition so that full heating current is supplied to said heater element.

4. The combination of claim 3 wherein: said television receiver includes at least one other tube having a heater element, with reduced heating current being supplied to each of the heater elements when said receiver is in its inoperative condition and with full heating current being supplied to each of the heater elements when said receiver is in its operative condition.

5. The combination of claim 2 further including: means for deenergizing said degaussing coil when the degaussing function is completed.

6. The combination of claim 5 wherein: said means for deenergizing said degaussing coil includes temperature responsive means operatively connected to said coil to reduce the current therethrough to a nominal value when the degaussing function is completed.

7. The combination of claim 6 wherein: said temperature responsive means includes a resistor having a negative temperature coefficient operatively connected across said coil to effectively shunt out said coil when said degaussing function is completed.

8. The combination of claim 5 wherein: said means for deenergizing said degaussing coil includes, a voltage responsive device operatively connected in series with said coil and a resistor having a negative temperature coefficient operatively connected across said coil and said voltage responsive device, said resistor being responsive to current flow therethrough to change to a low resistance state when the degaussing function is completed to effectively shunt said coil, the voltage responsive device being responsive to the voltage drop across the said resistor to change to a high impedance state when said resistor changes to a low resistance state to reduce the current through said coil to a nominal value.

9. The combination of claim 4 wherein: said switching means includes an on-off switch, with said on-off switching in its off position, said receiver being placed in its inoperative condition and said degaussing coil being placed in series between said source and said primary winding, and with said on-off switch in its on position, said receiver being placed in its operative condition, with said degaussing coil being disconnected from affecting the heating current to the heater elements.

10. The combination of claim 7 wherein: said switching means is operative to permit an output from said secondary winding when said receiver is placed in its operative condition and no output when said receiver is placed in its inoperative condition.

References Cited

UNITED STATES PATENTS

| | | | |
|---|---|---|---|
| 3,249,795 | 5/1966 | Dietch | 315—8 |
| 3,317,781 | 5/1967 | Barbin et al. | 315—8 |

JAMES W. LAWRENCE, *Primary Examiner*

V. LAFRANCHI, *Assistant Examiner.*